United States Patent [19]

Fadl et al.

[11] 4,030,202
[45] June 21, 1977

[54] BORE GAGE

[75] Inventors: Mohamed F. A. Fadl, West Warwick; Joseph S. Olasz, North Kingstown, both of R.I.

[73] Assignee: Federal Products Corporation, Providence, R.I.

[22] Filed: Dec. 12, 1975

[21] Appl. No.: 640,271

Related U.S. Application Data

[63] Continuation-in-part of Ser. No. 486,608, July 8, 1974, abandoned.

[52] U.S. Cl. .......................... 33/178 E; 33/143 L; 33/147 K
[51] Int. Cl.² ........................................... G01B 7/12
[58] Field of Search ......... 33/143 L, 147 K, 147 N, 33/178 R, 178 E, 178 F

[56] References Cited

UNITED STATES PATENTS

| | | | |
|---|---|---|---|
| 2,439,595 | 4/1948 | Cooke | 33/178 E |
| 2,622,331 | 12/1952 | Haines | 33/178 R |
| 3,939,568 | 2/1976 | Gonos et al. | 33/178 F |

FOREIGN PATENTS OR APPLICATIONS

| | | | |
|---|---|---|---|
| 1,535,816 | 7/1968 | France | 33/178 F |
| 807,086 | 10/1936 | France | 33/178 R |
| 1,019,832 | 11/1957 | Germany | 33/178 R |
| 884,111 | 7/1953 | Germany | 33/178 E |
| 762,361 | 11/1956 | United Kingdom | 33/178 E |

*Primary Examiner*—Richard E. Aegerter
*Assistant Examiner*—Richard R. Stearns
*Attorney, Agent, or Firm*—Barlow & Barlow

[57] ABSTRACT

A bore gage that is used for determining the diameter of a bore or hole is provided with a measuring head comprising a cylindrical housing. Within the housing is an electrical measuring member or transducer that can take the form of a linear voltage differential transformer. Contact points or probes are connected to each of the moving elements and pass through bearing members on the surface of the housing which retain the transducer therein.

2 Claims, 5 Drawing Figures

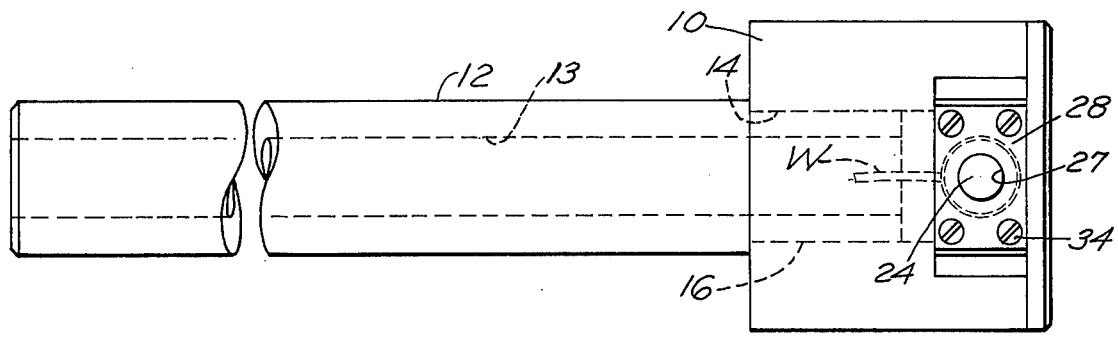
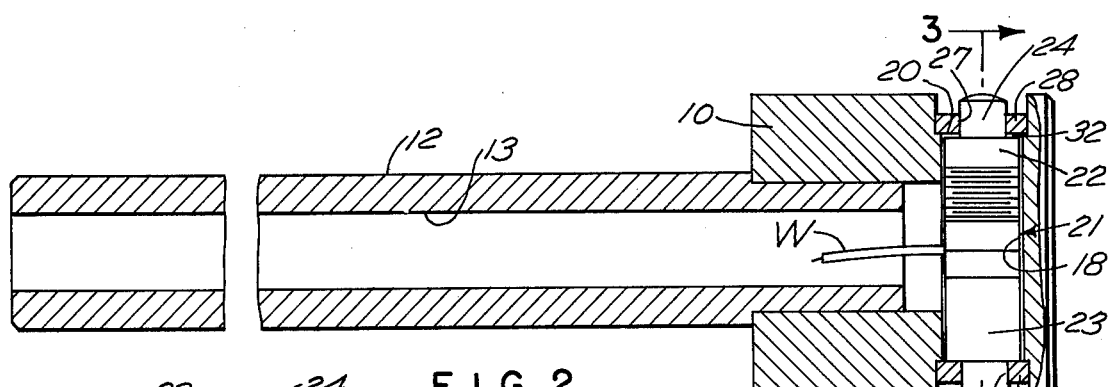
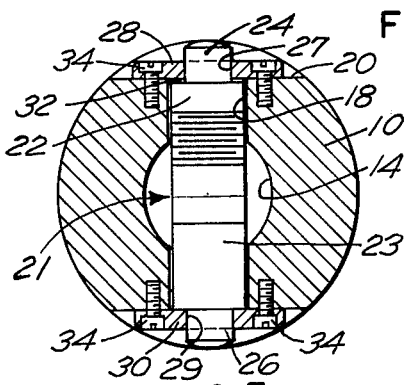
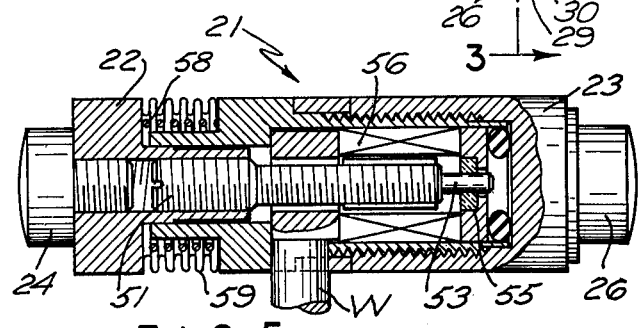
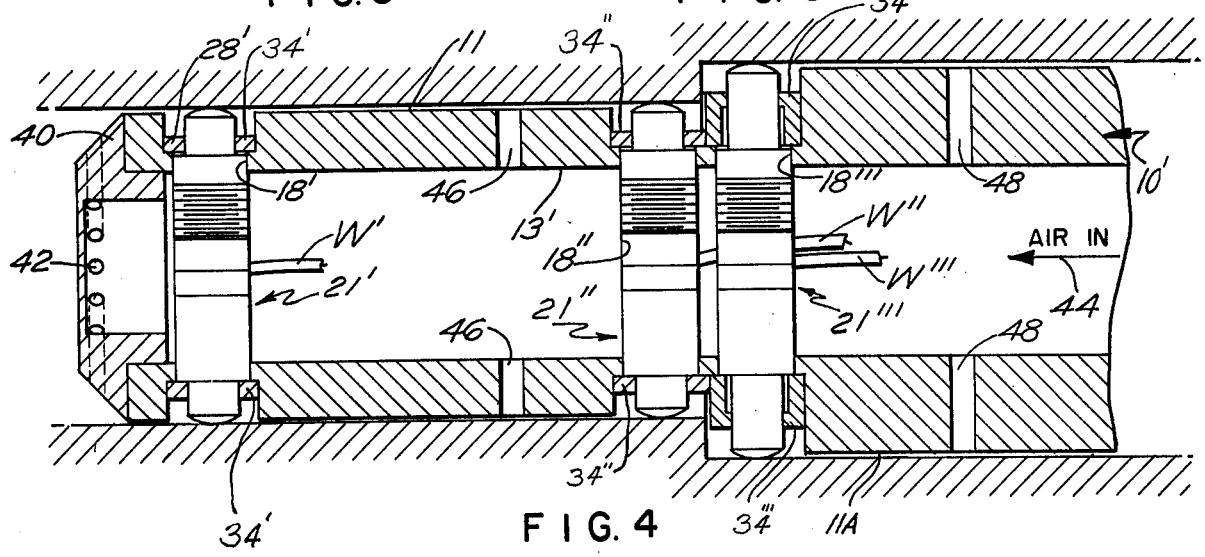

BORE GAGE

CROSS REFERENCE TO RELATED APPLICATION

This application is a continuation-in-part of our earlier filed application Ser. No. 486,608, now abandoned, filed July 8, 1974.

BACKGROUND OF THE INVENTION

In the past there have been two primary forms of bore gages, specifically a mechanically operated bore gage in which a moving contact point is mounted in a head with some centralizing device. The motion of the movable contact is transmitted to a dial indicator or other indicating means by a mechanical linkage of some sort as, for example, shown in U.S. Pat. No. 3,418,720. There are also provided in the art an electronic version of this arrangement where contact points through the medium of a leverage system transmit their motion to devices such as linear voltage differential transformers (LVDT) as shown by U.S. Pat. No. 2,642,671. A still further form of bore gage is a probe having a diameter close to the diameter of the bore to be measured; that is, slightly undersize on the order of say 5 thousandths of an inch. In directing air jets from this measuring head the principal operation of this latter form is shown in U.S. Pat. No. 2,846,871. In many cases bore gages must operate in rather dirty environments with coolant, chips, and other foreign matter being present. For various reasons the prior art schemes have not proven to be entirely satisfactory since there are a number of places where dirt can enter the system and upset any measurement that is being achieved.

SUMMARY OF THE INVENTION

This invention relates to a gaging device and more particularly a new and improved bore gage measuring apparatus. A stem used principally for mounting is provided and on the end of this stem is a cylindrical plug or housing having an axial bore that leads into the mounting stem area. Within the bore there is located a measuring device preferably in the form of a linear voltage differential transformer and this unit is made up as a cartridge having two contact points or probes extending from each end thereof and is loosely received on a diameter of the plug within the bore and maintained therein by a pair of bearing members in the form of apertured plates, the electrical lead being led out through the axial bore into the stem area and thence into external electronic devices. The cartridge element of the bore effectively acts as an electrical transducer which has a varying parameter, in this case inductance, that varies with the relative displacement between the two parts of the unit.

DESCRIPTION OF THE DRAWINGS

FIG. 1 is an elevational view of a bore gage made in accordance with the invention;

FIG. 2 is an elevational view partly in section illustrating the invention;

FIG. 3 is a sectional view taken on lines 3—3 of FIG. 2;

FIG. 4 is an elevational view partly in section illustrating another form of a bore gage which is particularly adapted to measure two different diameters;

FIG. 5 is an enlarged view of the measuring transducer with parts broken away into longitudinal sectional view.

DESCRIPTION OF THE PREFERRED EMBODIMENTS

Referring to FIG. 1 there is shown a bore gage having a plug end or housing 10 that is mounted onto a handle or mounting stem 12. Within the plug end 10 there is formed an axial bore 14. The handle or mounting stem 12 is provided with a reduced end portion 16 and this is fitted into the bore 14 in any suitable fashion so that the parts will remain together. Plug end 10 is also provided with a diametrical bore or cut out 18 which intersects the axial bore 14 and this diametrical bore 18 has at its ends a flat surface 20. When viewed in FIG. 2 it can be seen that the surface 20 extends substantially on a cord of the circular plug end 10.

Within the area formed by bore 14 and bore 18 is received a measuring transducer 21 which has two relatively movable parts 22, 23 biased apart by spring means and has an electrical lead W coming therefrom that enters the longitudinal bore 13 of the handle 12 so that it may come out to the end of the handle or mounting piece and be suitably interconnected with electronic measuring circuitry. Electrically the transducer is a linear voltage differential transformer which is commonly used to measure small displacements and consists generally of three coils and an armature. The electrical components are mounted in a cylindrical two-part cartridge.

Referring to FIG. 5, there is shown the essential elements of the measuring transducer 21. The part 22 carries the measuring probe 24 and in addition receives a threaded stem 51 therein that terminates in a pin end 53 that reciprocates in a bearing 55. The part 22 is received in a sliding fit within the bore of the part 23 and the part 23 carries a suitable electrical coil 56. Between the two parts 22 and 23 where they have their sliding fit is a spring means 58 and a sealing bellows 59 which covers the spring and is sealed to the part 22 and the part 23 to maintain a hermetic and dust-free enclosure when the aperture through which the wire W extends is suitably gasketed. It will be apparent that the spring 58 urges the parts 22 and 23 in a biased condition and that the threaded stem 51 cooperates with the coils 56 in a manner well known to cause flux changes and electrical signals.

For this particular discussion it is only necessary to realize that it is a cylindrical member having a pair of measuring probes 24, 26 biased apart by the spring means and extending out at either end thereof, one probe being connected to the windings coil and the other probe being connected to the movable core or armature. Essentially this is the same basic arrangement as illustrated in German Specification No. 746,936. The measuring probes 24, 26 are of a diameter less than the diameter of the body of the transducer 22 and pass on through apertures in retaining bearing plates 28, 30. Clearance is also provided so that the transducer is free to float diametrically of the plug 10, clearance being designated by the distance seen by reference numeral 32. Similarly it will be appreciated that the apertures 27, 29 through which the measuring probes extend allow freedom of movement of the measuring probes therethrough and provide bearings therefor. These plates are retained on the milled surfaces 20 by fastening devices such as screws 34, and accurately locate the probes on the diameter of the plug end 10. In effect, the probes are located on a chord of the cylindrical plug body.

Referring now to FIG. 4 of the drawings, there has been illustrated a slightly alternate embodiment of the invention and here we find a bore gage that is particularly adapted for gaging stepped bores. To this end, the plug body generally designated 10' is made in two diameters, a smaller diameter portion 11 and a larger diameter portion 11A. A central bore 13' extends down through the two sections 11 and 11A and comes to the terminal end of the plug where a fitting 40 which may be of frusto-conical shape is affixed, the conical surface thereof being pierced by a plurality of apertures 42. A number of transverse bores or cut-outs 18', 18" and 18"' are provided through the plug body 10' and into each of these is loosely fitted a transducer 21', 21" and 21"' respectively in a manner identical to the manner as described in connection with FIGS. 1 thru 3. Retaining plates 34', 34" and 34"' are fastened within milled surfaces of ends of bores 18', 18" and 18"' respectively and each of these transducers has leads w', w" and w"' that may extend up through the main longitudinal bore 13' of the plug. Additionally air as indicated generally by the arrow 44 is introduced into the bore 13' and this escapes through the apertures 42 and if necessary additionally through transverse bores 46 and 48 which terminate at the surface of the plug 10', the purpose of this being to clear chips, coolants and other debris from the bore while a measurement may be made.

In use, the plug body 10 is made preferably within a few thousandths of an inch of the bore that is to be measured. The tips of the probes 24, 26 are of uniform radius shorter than the radius of the bore to be measured and are located within the plug to be on a bisector of a chord thereof (which can be represented by surfaces 20). In this fashion the probes may easily be inserted into the bore to be measured, and it can be shown mathematically, that with a 0.75 inch bore to be measured, if the plug 10 is 0.747 inch diameter, that any chordal error with the two point contact system herein disclosed, is not greater than $6 \times 10^{-6}$ inch. Accordingly, an accurate instrument may be provided by the instant invention by controlling the positioning of the measuring probes on a diameter of the plug body by engaging the measuring probes themselves on a chord of the body near the periphery thereof and this reduces cosine errors.

We claim:

1. A bore gage comprising an elongated cylindrical housing, a substantially cylindrical electrical transducer within said housing having a pair of opposed measuring probes, each having a circular cross section, said transducer having a body of a diameter greater than the diameter of the measuring probes, said measuring probes extending in axial alignment outwardly of said housing on a diameter thereof, said housing including chordal surfaces, each chordal surface having an opening, bearing plate members on said chordal surfaces of the housing, said probes extending through the bearing members, said bearing members locating the probes on a diameter of the housing and dimensioned to serve as an abutment for the end walls of the transducer body, the maximum length of the body being less than the distance between the plate members whereby the transducer is free to move restrained only by said bearing members, said body being sealed to prevent entry of foreign material.

2. A bore gage as in claim 1 wherein said housing is provided with apertures therethrough whereby air introduced into the housing will escape through said apertures.

* * * * *